Feb. 9, 1937. N. SCHWARTZ 2,070,241
FILTER TYPE RESPIRATOR
Filed Oct. 12, 1935 2 Sheets-Sheet 1

INVENTOR.
NATHAN SCHWARTZ
BY Clark & Ott
ATTORNEYS

Feb. 9, 1937. N. SCHWARTZ 2,070,241
FILTER TYPE RESPIRATOR
Filed Oct. 12, 1935 2 Sheets-Sheet 2
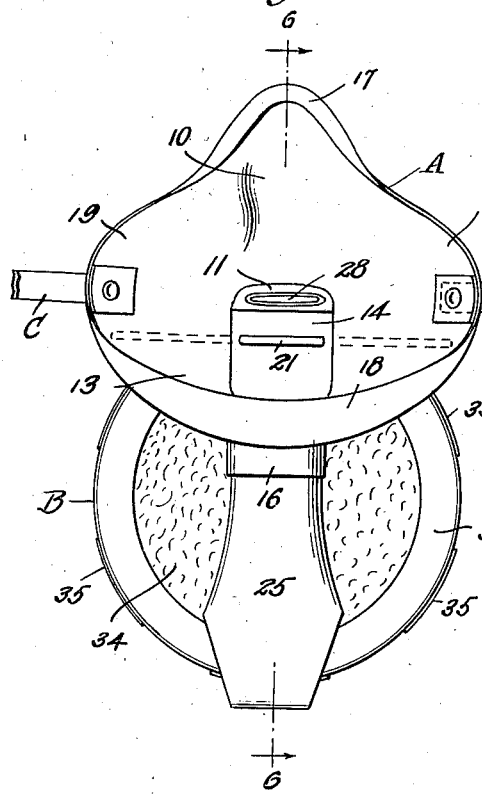
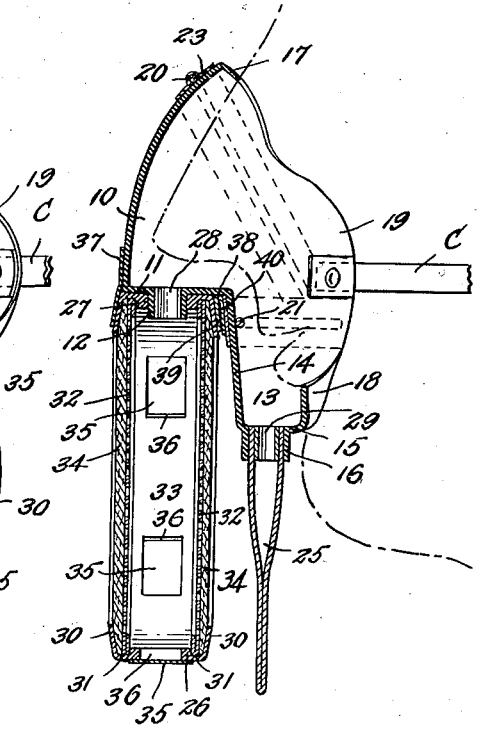
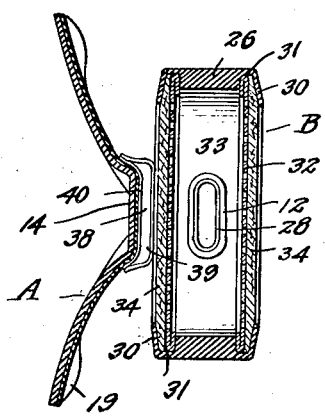
INVENTOR.
NATHAN SCHWARTZ
BY
Clark + Ott
ATTORNEYS Patented Feb. 9, 1937

2,070,241

UNITED STATES PATENT OFFICE 2,070,241

FILTER TYPE RESPIRATOR

Nathan Schwartz, New York, N. Y.

Application October 12, 1935, Serial No. 44,694

14 Claims. (Cl. 128—146)

This invention relates to filter type respirators adopted to cover the mouth and nose so as to exclude from the air inhaled by the wearer, foreign matter or other injurious substances such as dust or noxious fumes.

The invention broadly comprehends an improved filter type respirator in which the face piece and filter unit are so constructed and arranged as to afford maximum vision for the wearer irrespective of his posture, while defining a minimum air space within the face piece and filter unit in order to reduce the reinhalation of exhaled air.

The invention also resides in a respirator of the indicated character which includes an improved face piece adapted to cover the nose and mouth with inwardly directed angularly disposed flanges in the regions of the nose and chin which are adapted for edge contact therewith and which face piece is also provided with cheek flaps between said flanges adapted for flat contact with the cheeks.

As a further feature stiffening means is provided for effecting an intimate leak proof contact of said flanges and flaps with said portions of the face, which means is deformable so as to adjust and adapt the contracting portions to the contour of the face of the individual wearer and to maintain said contour until further adjustment is required.

Another object in view is to utilize the said stiffening means for holding the face piece in spaced relation to the nostrils and lips thereby making it possible to use a lighter, thinner and more flexible material for the face piece without causing discomfort to the wearer.

The invention further embodies in a respirator of the character set forth, a filtering unit which consists of an annular band of rubber or an equivalent material provided with internal grooves for the reception of foraminous filter element supports with flanges for removably holding the filter elements in effective covering relation to the supports and in which the band is so constructed as to facilitate the proper emplacement and the removal of the filter element supports while at the same time functioning to reduce the weight of the filter unit and effect an economy in the amount of stock required.

The invention furthermore contemplates means for effectually sealing the communicating connection between the face piece and the filter unit which means is also utilized to provide a firm connection for preventing relative movement and looseness between said face piece and filter unit while allowing for the flexing of said unit with reference to the face piece to permit of the emplacement and removal of the filter elements and their supports.

With the above and other objects in view, the invention is more particularly disclosed in the following specification and the accompanying drawings wherein a preferred embodiment exemplifies one form of the invention, while the appended claims cover variations and modifications thereof.

In the drawings:

Fig. 5 is a rear view thereof.

Fig. 6 is a vertical sectional view therethrough taken approximately on the line 6—6 of Fig. 5.

Fig. 7 is a sectional view taken approximately on the line 7—7 of Fig. 3.

Figure 1:
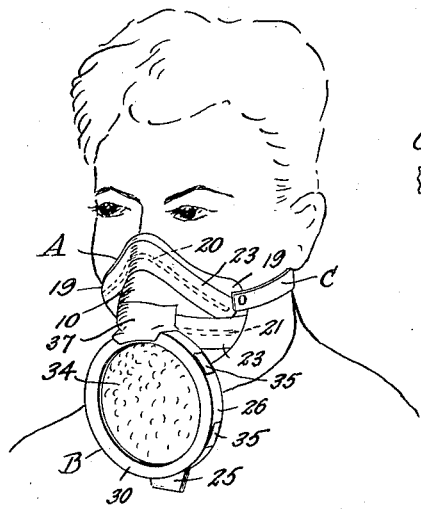
Fig. 1 is a perspective view of the improved respirator in applied position.
Figure 2:
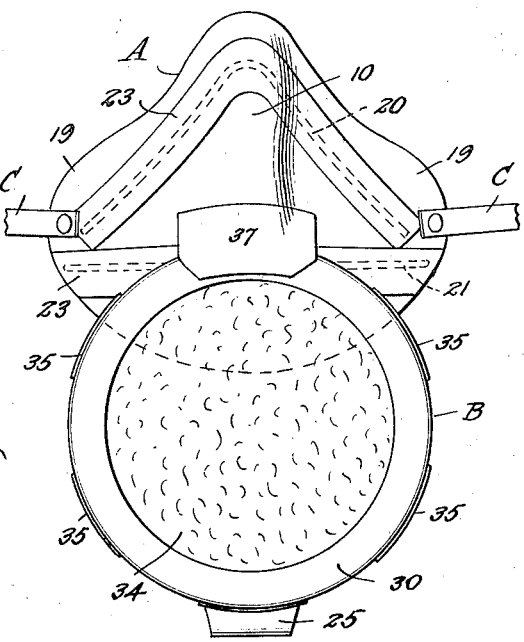
Fig. 2 is a front view thereof.
Figure 3:
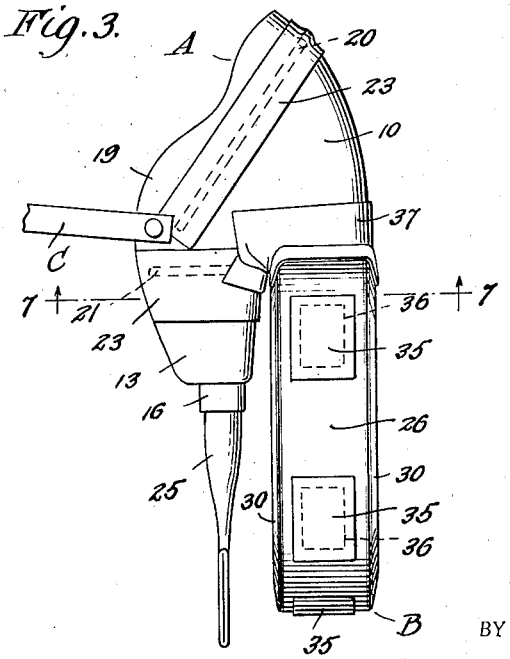
Fig. 3 is a side view of the same.
Figure 4:
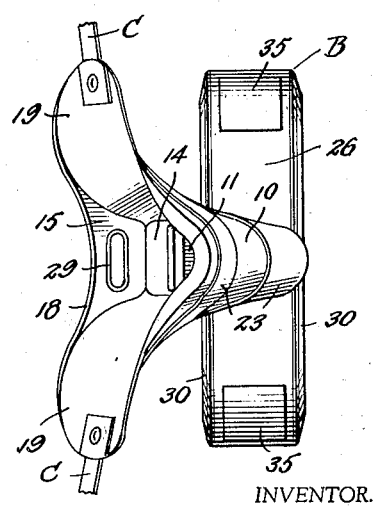
Fig. 4 is a top plan view of the respirator.

Referring to the drawings by characters of reference, the respirator includes a face piece designated generally by the reference character A and a filter unit designated generally by the reference character B, the face piece A being preferably constructed of molded rubber or any equivalent flexible material having the properties and characteristics of rubber. The face piece conforms generally to the shape of the face in the region of the nose and mouth and is formed with a hollow nose covering portion 10 having a lower horizontal wall 11 provided with a depending tubular boss 12. The mouth covering portion 13 is provided with a vertical forward wall 14 which is stepped back and extends downwardly from the lower wall 11 of the nose covering portion and includes also a lower rearwardly directed substantially horizontal wall 15 having a depending tubular boss 16.

The rear marginal edge of the face piece A is provided in the regions of the nose and chin with inwardly directed angularly disposed flanges 17 and 18, the free edges of which flanges are respectively contoured to fit and adapted for linear contact with the bridge of the nose and the lower portion of the lower lip, while the rear face of the flange 18 is designed to flatly contact with the chin immediately below the lower lip. The face piece is formed with cheek flaps 19 located at opposite sides thereof between the flanges 17 and 18 which flaps are adapted for flat contact with the cheeks of the wearer throughout a substantial area thereof. The cheek flaps have attached thereto the ends C of a supporting band structure for holding the respirator in applied position and for drawing the flanges 17 and 18 and the flaps 19 into intimate contact and sealing relation to the face to preclude any possibility of leakage around the margin of the face piece.

In order to adapt the face piece to the contour of the face of the individual wearer and to stiffen and maintain the same in a set position, deformable stiffening elements such as malleable wires 20 and 21 are provided which are secured throughout their length to the face piece, one extending across the nose covering portion 10, substantially parallel to the normal plane of the flange 17 and with opposite ends thereof traversing the cheek flaps, the other extending transversely of the wall 14 of the mouth covering portion 13 with the ends thereof traversing the cheek flaps. The stiffening means or wires 20 and 21, in addition to being deformable to adjust, adapt and maintain the contacting portions of the face piece properly contoured to the face of the individual wearer, also serve to hold the nose and mouth covering portions of the face piece in spaced relation to the nostrils and lips, thereby making it possible to use a thinner, lighter and more flexible material without contact of the covering portions with the face except where the flanges and cheek flaps provide the sealing contact. Obviously, the stiffening means may be secured to the face piece throughout their lengths in any desired manner, but as illustrated in the present disclosure, strips of rubber sheeting 23 are adhesively secured to the face piece in covering relation to the stiffening elements.

Any desired type of exhalation valve may be used in connection with the respirator, but as illustrated a flutter valve 25 of the conventional type is secured within the boss 16 and depends therefrom.

The filter unit B includes an annular body 26 preferably constructed of molded rubber or an equivalent elastic material provided with a radial opening 27 intermediate its side edges which is adapted to snugly receive the boss 12 depending from the lower wall 11 of the nose covering portion 10 of the face piece, whereby the filter unit is suspended directly under the nose covering portion 10 and in front of the mouth covering portion 13 of the face piece A where said unit will not interfere with the vision of the wearer. A length of light weight rigid tubing 28, preferably of metal, is fitted within the boss 12 and a similar length of tubing 29 is fitted within the upper end of the flutter valve at the region encompassed by the boss 16 so as to prevent distortion of the passages establishing communication between the face piece and the filter unit and the flutter valve. The annular body 26 of the filter unit is reduced in thickness at its opposite sides and is formed with annular inwardly directed marginal flanges 30 to provide internal annular grooves 31 adapted to receive a pair of foraminous filter element supports 32 which lie on opposite sides of the medial thicker portion of the annular body 26 between the same and the flanges 30 so as to provide a filtered air chamber 33. Filter elements 34, such as discs of felt or an equivalent material, are provided and removably retained in covering relation to the supports 32 by means of the flanges 30 so that they may be readily removed and replaced by flexing the flanges 30.

In order to facilitate the proper emplacement and removal of the filter element supports 32 in the grooves 31, and at the same time to reduce the weight of the filter unit, the annular body 26 is provided with circumferentially spaced relatively thin elastic areas 35 which permit of the introduction of the fingers to manipulate the supports 32 when emplacing the same in the grooves 31 or removing the same therefrom. As illustrated in the present disclosure, the elastic areas 35 are in the form of thin rubber patches adhesively applied to the outer periphery of the annular body 26 in covering relation to cut outs 36.

In order to provide an effectual seal and prevent leakage at the juncture of the filter unit B with the face piece, a thin strip 37 of rubber or an equivalent elastic material is adhesively applied to the nose covering portion and extends over the forward flange 30 of the filter unit and over the exterior periphery of the annular body 26. A similar strip 38 is doubled upon itself and the forward and rear leads 39 and 40 thereof are adhesively applied respectively to the rear flange 30 and to the forward wall 14 of the mouth covering portion 13 of the face piece with the side edges adhesively joined to the side edges of the strip 37. In order to retain the filter unit in a firm position perpendicular to the wall 11 of the nose covering portion and substantially parallel to the wall 14 of the mouth covering portion so as to prevent forward swinging of the same when the wearer faces downwardly, the adhesively connected side edges of the strips 37 and 38 are folded inwardly and adhesively connected to the connected portion of the forward lead 39 of the strip 38, thereby providing spanning webs which, while preventing accidental flexing or swinging of the filter unit, permit the same to be forceably swung sufficiently to facilitate the emplacement and removal of the rear filter unit 34 and the rear filter unit support 32.

From the foregoing construction, it will be observed that due to the closely spaced relation of the face piece with the covered portion of the face of the wearer and the relatively small size of the filtered air chamber defined between the filter unit supports within the annular wall 26, a volume of air enclosed by the respirator reduces to a minimum the amount of exhaled air which is reinhaled. It will also be apparent that in proportion to the amount of filtered air space within the filter unit, a relatively large filtration area is provided by the combined filter elements while the vision of the wearer is not obstructed irrespective of his posture.

What is claimed is:

1. A filter type respirator including a face piece adapted to cover the nose and mouth of the wearer, inwardly directed angularly disposed flanges at the marginal edges of the face piece in the regions of the nose and chin, the free edges of which flanges are adapted for linear contact with the bridge of the nose and the under portion of the lower lip, and flaps located at opposite sides of the face piece between said flanges and adapted for flat contact with the cheeks.

2. A filter type respirator including a face piece adapted to cover the nose and mouth of the wearer, inwardly directed angularly disposed flanges at the marginal edges of the face piece in the regions of the nose and chin, the free edges of which flanges are adapted for linear contact with the bridge of the nose and the under portion of the lower lip, flaps located at opposite sides of the face piece between said flanges and adapted for flat contact with the cheeks, and deformable means secured to said face piece for stiffening the same transversely.

3. A filter type respirator including a face piece adapted to cover the nose and mouth of the wearer, inwardly directed angularly disposed flanges at the marginal edges of the face piece in the regions of the nose and chin, the free edges of which flanges are adapted for linear contact with the bridge of the nose and the under portion of the lower lip, flaps located at opposite sides of the face piece between said flanges and adapted for flat contact with the cheeks, and deformable means secured to said face piece for stiffening the same transversely in the regions of the nose and mouth covering portions.

4. A filter type respirator including a face piece adapted to cover the nose and mouth of the wearer, inwardly directed angularly disposed flanges at the marginal edges of the face piece in the regions of the nose and mouth covering portions thereof, the free edges of which flanges are adapted for linear contact with the bridge of the nose and the lower portion of the lower lip, flaps located at the opposite sides of the face piece between said flanges and adapted for flat contact with the cheeks, and means secured to said face piece for stiffening the same transversely in the regions of the nose and mouth covering portions, said means being of a deformable material to adjust, adapt and maintain the contacting portions contoured to the face of the individual wearer.

5. A filter type respirator including a face piece adapted to cover the nose and mouth of the wearer, inwardly directed angularly disposed flanges at the marginal edges of the face piece in the regions of the nose and mouth, the free edges of which flanges are adapted for linear contact with the bridge of the nose and the lower portion of the lower lip, flaps located at opposite sides of the face piece between said flanges and adapted for flat contact with the cheeks, and deformable means secured to said face piece for stiffening the same in the regions of the nose and mouth covering portions.

6. A filter type respirator including a face piece having a hollow nose covering portion and a set back mouth covering portion, an exhalation valve connected to said face piece and having communication with said chin covering portion, a filter unit having communication with the interior of the face piece through the nose covering portion and resilient means normally securing the filter unit to the bottom wall of the nose covering portion and adjacent to the mouth covering portion and permitting of the swinging of the filter unit outwardly with reference to the said mouth covering portion.

7. In a respirator, a face piece of molded elastic material adapted to enclose the nose and mouth of the wearer, including hollow nose and mouth covering portions, and vertically spaced means extending across the face piece for stiffening the same and holding said nose and mouth covering portions in spaced relation to the nose and mouth of the wearer.

8. In a respirator, a face piece of molded elastic material adapted to enclose the nose and mouth of the wearer, including hollow nose and mouth covering portions, vertically spaced means extending across the face piece for stiffening the same and holding said nose and mouth covering portions in spaced relation to the nose and mouth of the wearer, inwardly directed angularly disposed flanges at the upper and lower portions of the marginal edge of the face piece adapted for edge contact respectively with the nose and the under portion of the lower lip, and flaps located between said flanges at opposite sides of the face piece and adapted for flat contact with the cheeks.

9. In a respirator, a face piece of molded elastic material adapted to enclose the nose and mouth, inwardly directed angularly disposed flanges at the marginal edge of said face piece adapted for edge contact with the nose and with the under portion of the lower lip, flaps located between said flanges at opposite sides of the face piece for flat contact with the cheeks, hollow nose and mouth covering portions of said face piece and vertically spaced deformable means extending across the face piece for contouring the same to conform to the shape of the face and for stiffening and holding said nose and mouth covering portions in spaced relation to the nose and mouth of the wearer.

10. In a respirator, a face piece of molded elastic material including nose and mouth covering portions adapted for marginal contact with the face of the wearer, and deformable means extending across the face piece for adjusting the same to conform to the contour of the face and for stiffening and holding said nose and mouth covering portions in spaced relation to the nose and mouth of the wearer.

11. In a filter type respirator including a face piece adapted to enclose the nostrils and mouth of the wearer and a filter unit having a circumferential wall and side walls at least one of which is provided with an intake having means for filtering the air and means of communication between the face piece and the circumferential wall of the filter unit.

12. In a filter type respirator including a face piece adapted to enclose the nostrils and mouth of the wearer having a recessed portion lying under the nose and in front of the mouth of the wearer, a filter unit located within the recessed portion of the face piece and having communication therewith, said filter unit including a marginal wall having continuous inwardly directed flanges and internal grooves defined in part by said flanges, filter elements and foraminous supports therefor located within said grooves with the filter elements retained in place by said flanges.

13. A filter type respirator including a face piece having a hollow nose-covering portion formed with a lower wall provided with an opening, and a set back mouth-covering and enclosing portion, and a filter unit comprising an independent casing located under said nose covering portion and in front of the mouth-covering and enclosing portion and secured to and having a peripheral opening communicating with the interior of the face piece through the opening in the lower wall of the nose-covering portion, and a removable filter element in said casing.

14. A filter type respirator including a face piece adapted to cover the nose and mouth of the wearer, an inwardly directed angularly disposed flange at the marginal edge of the face piece in the region of the nose, the free edge of which flange is adapted for linear contact with the bridge of the nose, and flaps located on opposite sides of the face piece adjacent said flange and adapted for flat contact with the cheeks of the wearer.

NATHAN SCHWARTZ.